Patented June 6, 1950

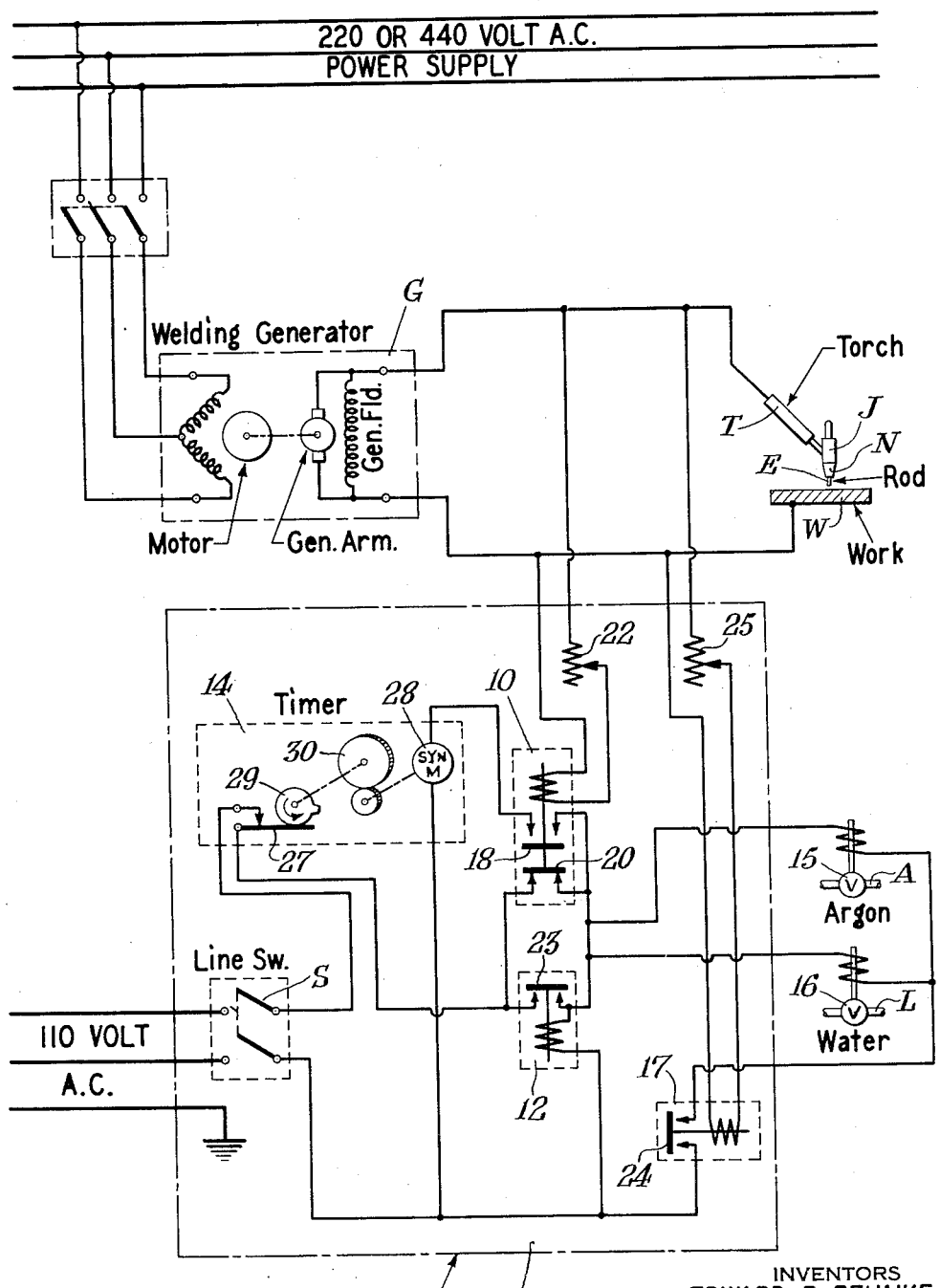

2,510,207

UNITED STATES PATENT OFFICE 2,510,207

FLUID CONTROL FOR INERT GAS BLANKETED ARC WELDING

Edward R. Behnke, Newark, and Stanley H. Royer, Elizabeth, N. J., assignors to The Linde Air Products Company, a corporation of Ohio Application May 4, 1949, Serial No. 91,246

6 Claims. (Cl. 219—8)

This invention relates to fluid control for inert gas blanketed arc welding torches, and more particularly to automatic control of the flow of inert gas to welding torches in which an annular stream of inert gas flows along the electrode to blanket the arc and molten portions of the work during the welding operation.

It has been customary to manually cut off the flow of inert gas as soon as the weld is completed. This leaves the highly heated electrode unprotected from oxidation by the atmosphere air, resulting in short life of the electrode.

It is therefore the main object of the present invention to provide an automatic control for continuing the flow of inert gas until the electrode has cooled below oxidation temperature.

A large proportion of these torches are water cooled, and flow of cooling water during non-welding periods may be costly. More important, moisture will condense on equipment during non-welding periods when atmospheric temperature and humidity are high, and cooling water temperature is low.

It is therefore a further object of the present invention to provide an automatic control for cutting off the flow of cooling water after the electrode has cooled below oxidation temperature.

According to the present invention, a valve is provided for controlling the supply of gas to the conduit which passes gas to the torch nozzle, operating means are provided for the valve, and means responsive to voltage change in the welding circuit are provided for actuating the valve operating means. A similar valve and operating means are provided in the cooling water supply conduit, and actuated by the same or similar voltage responsive means.

Other objects and features of novelty will be apparent from the following description and the accompanying drawing, in which the single figure is a wiring diagram of the control device according to the present invention.

As shown in the drawing, the torch T comprises an electrode E surrounded by a nozzle N to which inert gas such as helium or argon is supplied by a conduit A controlled by an argon valve 15. A motor driven welding generator G energizes the welding circuit which passes through the electrode E and the work W when an arc is struck. The torch T has a cooling jacket J to which cooling liquid is suplied by a conduit L controlled by a water valve 16. The operation desired is controlled by a control box B, energized through a line switch S. The control box B comprises a timer starting relay 10, a holding relay 12, a valve closing timer 14, and a shut-off relay 17. The timer starting relay has a normally open switch 18 and a normally closed switch 20. The coil of the relay 10 is shunted across the terminals of the welding generator in series with an adjustable resistance 22 which is adjusted to cause the relay to respond to increase from arc voltage to open circuit voltage.

The holding relay 12 has a normally open switch 23, and a coil which is in series with the switch 20 of the starting relay 10. The shut-off relay 17 has a normally open switch 24 and a coil in series with an adjustable resistance 25. The shut-off relay 17 prevents the argon and water valves from remaining open when the welding generator is turned off and the control unit is left on.

The timer 14 has a normally closed switch 27, and a motor 28 which is in series with the switch 18 of the starting relay 10. The motor 28 drives a cam 29 through a gearing or escapement 30, which after the time period for which the timer is adjusted, causes the cam to open the switch 27.

For the purposes of the main object of the present invention, it will be assumed that the apparatus is in operation, the welding arc is established, and welding is in progress. When the welding arc is extinguished by removing the electrode from the workpiece, the welding circuit voltage increases from arc voltage to full open circuit voltage. This condition energizes the coil of starting relay 10 which closes its switch 18 and opens its switch 20. Closing switch 18 energizes the timer motor 28 which starts the gearing or escapement 30 running, but switch 27 remains closed for the time delay period. Through switch 27 the coil of relay 12 remains energized, and its switch 23 closed, so that notwithstanding the opening of switch 20, the argon valve 15 and the water valve 16 remain open, being energized through switches 27 and 23.

At the expiration of the time delay period, the cam 29 opens the switch 27, which opens the circuit for the argon valve 15 and the water valve 16, which return to their normally closed positions.

The sequence of operations for starting up, welding, and stopping will now be described in chronological order.

When all of the apparatus is connected as shown in the drawing, but the welding generator is not running and the control box line switch S is open, the relay 17 is de-energized with its switch 24 open, the relay 10 is de-energized with its switch 18 open and its switch 20 closed. The timer 14 is de-energized with its switch 27 closed and its motor 28 not running. The holding relay 12 is de-energized with its switch 23 open. The argon valve 15 and water valve 16 are closed.

When the control box line switch S is closed, the hold-down relay 12 is energized through switches 27 and 20 to close its switch 23. When the welding generator is turned on, the relay 17 is energized through the resistance 25 to close its switch 24, and the relay 10 is energized to close its switch 18 and open its switch 20. The opening of switch 20 has no effect because it is in parallel with switch 23 of holding relay 12. Closing switch 18 energizes the timer 14 and starts its motor running, but the switch 27 remains closed for the time delay period.

If nothing more is done before the time period expires, the motor opens the switch 27, which de-energizes the relay 12, opens the switch 23, which closes the argon valve 15 and the water valve 16.

It is undesirable to establish the welding arc until the argon valve has been turned on long enough to purge the line and blanket the electrode with full argon flow, all before the electrode can get as hot as it would if the full arc were struck. For this purpose the welding electrode is touched to or barely scratched on the workpiece. This causes the open circuit voltage to decrease to some value approaching arc voltage. This de-energizes the starting relay 10, opening its switch 18, which de-energizes the timer motor 28 and closes switch 27. The starting relay 10 also closes switch 20, which opens the argon valve and the water valve.

The welding electrode is immediately removed from the workpiece, before a welding arc can be established, which causes the welding circuit to return to full open circuit voltage. This energizes the starting relay 10, closing switch 18 which energizes the timer motor 28 and starts it running.

After this preliminary scratching or purging step, the electrode is returned and the welding arc is established to begin welding, by touching the electrode to the workpiece. This decreases the open circuit voltage to arc voltage, opening relay 10 and de-energizing the timer motor 28 which automatically resets. During the welding operation, the relay 17 remains energized with its switch 24 closed, the relay 10 remains de-energized with its switch 18 open and its switch 20 closed, the relay 12 remains energized with its switch 23 closed, and the argon valve 15 and water valve 16 remain open.

When the welding arc is extinguished by removing the electrode from proximity to the workpiece, the relay 10 is energized to close its switch 18, energize the timer 14 and start its motor 28 running. At the expiration of the time delay period the timer 14 opens its switch 27 which closes the argon valve 15 and the water valve 16.

What is claimed is:

1. In a gas blanketed arc welding apparatus comprising a torch having an electrode and a nozzle, an electric circuit for passing welding current through said electrode and the work, a conduit for passing gas to said nozzle, a cooling jacket for said torch, and a conduit for supplying cooling liquid fluid to said jacket, the improvement which comprises a valve for controlling the supply of fluid to one of said conduits, means for operating said valve, and means responsive to voltage change in said electric circuit for actuating said valve operating means.

2. In a gas blanketed arc welding apparatus comprising a torch having an electrode and a nozzle, an electric circuit for passing welding current through said electrode and the work, and a conduit for passing gas to said nozzle, the improvement which comprises a valve for controlling the supply of gas to said conduit, means for operating said valve, and means responsive to voltage change in said electric circuit for actuating said valve operating means.

3. In a gas blanketed arc welding apparatus comprising a torch having an electrode and a nozzle, an electric circuit for passing welding current through said electrode and the work, a conduit for passing gas to said nozzle, and a conduit for supplying cooling fluid to the torch, the improvement which comprises a valve for controlling the supply of cooling fluid to said conduit, means for operating said valve, and means responsive to voltage change in said electric circuit for actuating said valve operating means.

4. In a gas blanketed arc welding apparatus comprising a torch having an electrode and a nozzle, an electric circuit for passing welding current through said electrode and the work, and a conduit for passing gas to said nozzle, the improvement which comprises a valve for controlling the supply of gas to said conduit, means responsive to arc voltage when an arc is struck between said electrode and the work for opening said valve, a time delay device for effecting closing said valve and means responsive to open circuit voltage when said electrode is removed from the work to extinguish the arc for setting said time delay device to close said valve a predetermined time delay interval after the arc is extinguished.

5. In a gas blanketed arc welding apparatus comprising a torch having an electrode and a nozzle, an electric circuit for passing welding current through said electrode and the work, and a conduit for passing gas to said nozzle, the improvement which comprises a valve for controlling the supply of gas to said conduit, means responsive to arc voltage when the electrode is touched to the work momentarily without heating the electrode to oxidation temperature for opening said valve, said valve opening means being further responsive to arc voltage when a welding arc is struck for maintaining said valve open during the welding operation.

6. In a gas blanketed arc welding apparatus comprising a torch having an electrode and a nozzle, an electric circuit for passing welding current through said electrode and the work, and a conduit for passing gas to said nozzle, the improvement which comprises a valve for controlling the supply of gas to said conduit, and means responsive to arc voltage for opening said valve, comprising a control circuit including a starting relay, a time delay mechanism energized by said starting relay, a holding relay for said starting relay, and a safety relay for de-energizing said control circuit.

EDWARD R. BEHNKE.
STANLEY H. ROYER.

REFERENCES CITED

The following references are of record in the file of this patent:

UNITED STATES PATENTS

| Number | Name | Date |
|---|---|---|
| 2,329,904 | Howard | Sept. 21, 1945 |